Sept. 19, 1967   M. J. QUINTO   3,342,205
SLIDE VALVE
Filed July 28, 1965

INVENTOR.
MARIO J. QUINTO
BY
*F. J. Pisarra*
ATTORNEY

United States Patent Office 3,342,205
Patented Sept. 19, 1967

3,342,205
SLIDE VALVE
Mario J. Quinto, 511 Center Ave.,
Mamaroneck, N.Y. 10543
Filed July 28, 1965, Ser. No. 475,409
5 Claims. (Cl. 137—375)

This invention relates to the art of valves and, more particularly, to a slide valve having improved features of design and construction.

The invention pertains, in one of its more specific aspects, to improvements in slide valves of the type commonly referred to in the trade as a sliding spool valve. A conventional sliding spool valve usually comprises a tubular body having a plurality of ports establishing communication between its exterior and interior. The body is provided with a plurality of spaced internal annular recesses which are formed by a machining procedure. Certain of the recesses accommodate sealing rings which engage a slide member for the purpose of forming a seal between the body and the slide member. The slide member is provided with peripheral grooves for establishing communication between selected other recesses when the member is in a predetermined position relative to the body. Such grooves are equal in length and their opposite ends terminate on corresponding circumference of the member.

Among the factors which contribute substantially to the cost of manufacturing conventional sliding spool valves are the time and labor involved in machining the internal annular recesses. Great care must be taken with the view of properly forming these recesses. Experience has demonstrated that, despite such care, the portions of the body which define the annular recesses are frequently marred, due to scarring and the like by the cutting tool. This is highly objectionable, especially in the annular recesses for the sealing rings, for the reason that it is either difficult or impossible to obtain effective seals.

Another objection to conventional sliding spool valves resides in the fact that the indicated arrangement of grooves in the slide member does not permit of fine vernier flow control of fluid between selected ports and creates undesirable fluid impacts or "water hammer" during rapid closure of the valve.

The difficulties and objections experienced in the past are successfully eliminated by the slide valve of this invention which preferably comprises a tubular core formed with a plurality of annular first recesses and a plurality of annular second recesses that extend outwardly from its inner surfaces. The recesses are spaced along and normal to the axis of the core and are so arranged that each first recess is located intermediate a pair of successive second recesses. A valve body is molded around the core. The valve includes a plurality of spaced independent ports. Each port is formed in the body and the core and establishes direct communication between the body and a corresponding first recess.

A valve member is slideable in the core and is provided with a plurality of peripheral, circumferentially spaced, longitudinal grooves. The valve also comprises a plurality of flexible rings, each of which registers with a corresponding second recess and bears against the periphery of the valve member. The length of each groove is greater than the distance between a pair of successive first recesses but less than the distance between the regions of engagement of a pair of successive sealing rings with the valve member. Depending on the axial position of the valve member within the core, a selected pair of ports are adapted to be placed into or out of communication with each other.

The core or liner constitutes one of the important features of this invention. It is made of a length of thin-walled cylindrical tubing that is composed of a suitable metal, preferably stainless steel, which is formed to required exacting dimensions and configuration in a master die or by a slide rolling machine to obtain the various annular recesses. The surfaces which define the annular recesses are smooth and free of scars or other imperfections which might adversely affect sealing.

The valve body is made of any suitable material and is molded on the core, whereby the contiguous surfaces of the body and the core are in intimate fluid-tight engagement. The material of the body depends on the nature and temperature of the fluids with which it is to be used. While the body material may be an appropriate metal, it preferably consists of a suitable thermosetting or thermoplastic synthetic resin composition, such a polypropylene, Teflon, nylon, polyvinyl chloride or Penton.

The grooves in the slide member, instead of being equal in length and arranged as earlier described with reference to conventional valves, are preferably of different lengths or of equal lengths and staggered. I have discovered that this permits of fine control of fluid flow and eliminates the "water hammer" effect which is inherent in conventional valves.

The valve of this invention has wide application. It may be advantageously employed to control the flow of various fluids, such as air or other gases, liquids and mixtures of gases and liquids, without contamination of the fluids by the materials of the valve parts or damage to the valve parts due to the nature of particular fluids. Also, the valve may be configured for any desired multi-port flow arrangement, including, but not limited to, 2 way-2 port, 3 way-3 port arrangements and modifications thereof. Moreover, the valve of this invention is adapted to be operated manually or by various mechanical, electromechanical or fluid-actuated means known to the art.

The primary object of this invention is to provide a slide valve having improved features of design and construction.

Another object of this invention is the provision of an improved sliding spool valve that adequately withstands internal pressures; that provides an effective low-friction seal between relatively movable parts; that permits of fine metering of various fluids; and that eliminated water hammer effects due to rapid valve closure.

A further object of this invention is to provide a valve of the character indicated that is simple, compact and light-weight in design; that is sturdy and durable in construction; that is reasonable in manufacturing and maintenance costs; and that is capable of performing its intended functions in an efficient and trouble-free manner.

The enumerated objects and additional objects together with the advantages of this invention will be readily understood by persons versed in the art from the following detailed description and the accompanying drawing which describe and illustrate several valve constructions embodying the invention.

In the drawing, wherein like reference numerals denote corresponding parts throughout the several views.

Figure 1:
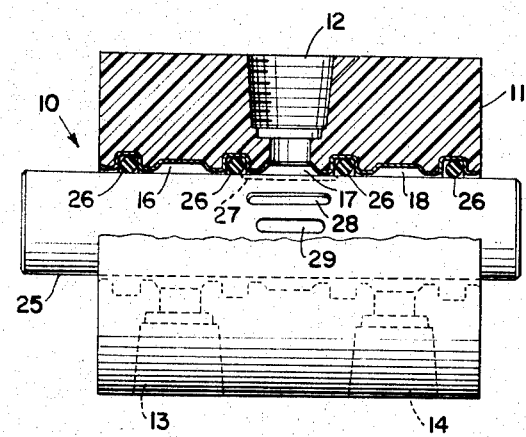
FIG. 1 is a side elevation view, partly in central vertical cross-section, of a 3 way-3 port slide valve constructed in accordance with this invention.
Figure 2:
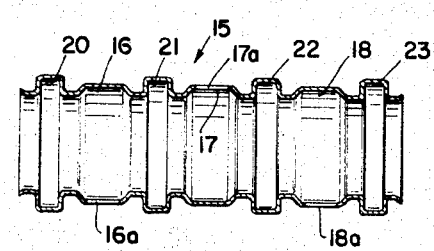
FIG. 2 is a view in central longitudinal cross-section of a tubular core which is part of the valve shown in FIG. 1.

Referring initially to FIGS. 1 and 2 of the drawing, I have illustrated therein a valve 10 which comprises a hollow body 11 that is preferably made of a suitable synthetic resin composition of the character mentioned earlier herein. The body is provided with a plurality of spaced tapped ports 12, 13 and 14.

Body 11 is molded around a metallic core 15 which is preferably made from a section of thin-walled stainless steel tubing. The tubing, as earlier described, is expanded to form a plurality of relatively wide, spaced, annular first recesses 16, 17 and 18 and a plurality of relatively narrow, spaced, annular second recesses 20, 21, 22 and 23. Each first recess 16, 17 and 18 has a corresponding through opening 16a, 17a and 18a, which respectively communicate with ports 13, 12 and 14. This construction permits direct communication between the exterior of the valve and each of the first recesses by way of the corresponding ports.

Slidable in core 15 is a right circular cylindrical valve member 25. The diameter of the valve member is slightly smaller than that of the portions of the core which defines its inner surface. A flexible sealing ring 26 is seated in each second recess 20, 21, 22 and 23 and engages valve member 25 whereby to form effective fluid seals between the core and the valve member. The sealing rings are made of natural rubber, synthetic rubber or any other appropriate material that is compatible with fluids to be handled by the valve. It will be noted from an examination of FIG. 1 that the distance between a pair of successive first recesses, such as recesses 16 and 17, is less than the distance between the regions of engagement of a pair of successive sealing rings with the valve member.

The valve member is provided with at least one set of circumferentially spaced peripheral grooves 27, 28 and 29. These grooves are progressively shorter in length. Each groove is shorter than the distance between the areas of engagement of a pair of successive sealing rings 26 with the valve member but longer than the distance between a pair of successive first recesses 16, 17 and 18. Accordingly, when the parts are in the relative position shown in FIG. 1, fluid admitted into recess 17 by way of port 12 and opening 17a is prevented by the sealing rings to opposite sides of this port from flowing into either of recesses 16 or 18. However, when the valve member 25 is moved a predetermined distance to the left, as viewed in FIG. 1, fluid admitted through port 12 flows, by way of recess 17, grooves 27, 28 and 29 and recess 16, into port 13. Similarly, when the valve member is moved a predetermined distance to the right from the position shown in FIG. 1, port 12 is placed in communication with port 14 by way of recess 17, grooves 27, 28 and 29 and recess 18. It will hence be observed that port 12 is adapted to be placed into and out of communication with either of ports 13 and 14.

By making grooves 27, 28 and 29 of different lengths, they are successively placed in communication with selected pairs of recesses during sliding movement of member 25 in either direction. This permits fine control of fluid flow and eliminates objectionable water hammer which frequently occurs in conventional slide valves.

Figure 3:
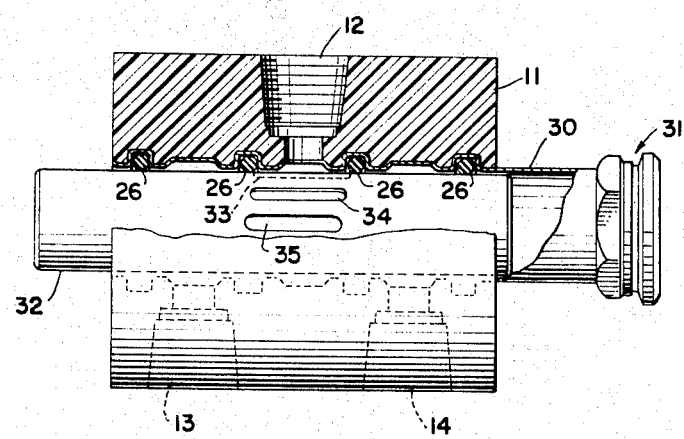
FIG. 3 is a view similar to FIG. 1 and illustrates a modified form of the invention.
Figure 4:
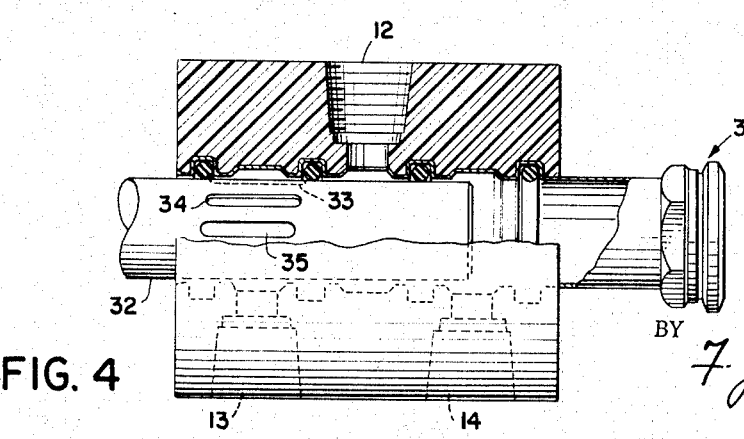
FIG. 4 corresponds to FIG. 3 and shows the parts in another relative position.

Reference is next had to FIGS. 3 and 4 which illustrate a modified form of slide valve that is constructed in accordance with this invention. This valve includes a number of parts which are identical with the earlier described valve. It also includes a core or liner 30 that is similar to but longer than core 15. Core 30 is provided with a means 31 for closing the end thereof which extends beyond body 11 or for coupling that end to a conduit or the like (not shown).

The valve of FIGS. 3 and 4 also comprises a valve member 32 which is similar to earlier described valve member 25. Valve member 32 is provided with at least one set of circumferentially spaced peripheral grooves 33, 34 and 35 which are staggered along the member. Valve member 32 differs from valve member 25 principally in that its grooves 33, 34 and 35 are of equal length whereas grooves 27, 28 and 29 of valve member 25 are of different length. The grooves of valve member 32 function in the same general manner as grooves 27, 28 and 29. It will be appreciated that the grooves of valve member 25 may be substituted for the grooves of valve member 32 or vice versa, as desired. In any case, the junctures of the grooves with the peripheries of the valve members are rounded and smooth to prevent damage to the sealing rings and to minimize sliding friction during operation of the valve members.

The valve of FIGS. 3 and 4 is adapted to be operated and function in the same manner as valve 10. Moreover, when the valve member 32 is moved from the position shown in FIG. 3 to that shown in FIG. 4, port 14 is placed in direct communication with the extended portion of core 30 by way of recess 18. Thus, by extending the core beyond the valve body, it may be used to increase the overall utility of the valve.

From the foregoing, it is believed that the objects, construction, operation and advantages of my present invention will be readily comprehended by persons skilled in the art, without further description. Although the invention has been herein shown and described in several simple and practicable forms, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the following claims.

I claim:

1. A slide valve comprising a tubular core formed with a plurality of inside and outside diameters and defining a plurality of annular first recesses and a plurality of annular second recesses that extend outwardly from its inner surface, said recesses being spaced along the core and arranged so that each first recess is located intermediate a pair of successive second recesses, a body having an opening, the core being positioned in said opening, the portion of the body which defines said opening having a configuration corresponding to that of the outside surface of the core and being in intimate contact therewith on the entire outside surface of the core within said opening, the valve being provided with a plurality of independent ports, each port being formed in the body and the core and establishing direct communication between the exterior of the body and a corresponding first recess, a valve member slidable in the core and having at least one groove which extends inwardly from its outer surface, and a plurality of flexible sealing rings, each sealing ring being seated in a corresponding second recess and bearing against the peripheral surface of the valve member, the length of said groove measured longitudinally of the valve member being greater than the distance between a pair of successive first recesses and less than the distance between the regions of engagement of a pair of successive sealing rings with the valve member.

2. A slide valve comprising a tubular core that is formed with a plurality of inside and outside diameters, that is circular in transverse cross-section and that defines a plurality of annular first recesses and a plurality of annular second recesses that extend outwardly from its inner surface, said recesses being spaced along the core and arranged so that each first recess is located intermediate a pair of successive second recesses, a body having an opening, the core being positioned in said opening, the portion of the body which defines said opening having a configuration corresponding to that of the outside surface of the core and being in intimate contact therewith on the entire outside surface of the core within said opening, the valve being provided with a plurality of independent ports, each port being formed in the body and the core and establishing direct communication between the exterior of the body and a corresponding first recess, a right circular cylindrical valve member slidable in the core and having a plurality of circumferentially spaced longitudinal grooves which extend inwardly from its peripheral surface, and a plurality of flexible sealing rings, each sealing ring being seated in a corresponding second recess and bearing against the periphery of the valve member, the length of each groove being greater than the distance between a pair of successive first recesses and less than the distance between the regions of engagement of a pair of successive sealing rings with the valve member.

3. A valve according to claim 2 wherein the grooves are of different length.

4. A valve according to claim 2 wherein the core comprises a relatively thin-walled metallic tube and the body comprises a synthetic resin composition.

5. A valve according to claim 2 wherein the core extends beyond an end of the body.

References Cited

UNITED STATES PATENTS

| | | | |
|---|---|---|---|
| 2,342,763 | 2/1944 | Smith | 137—625.25 X |
| 2,822,824 | 2/1958 | Glower et al. | 251—368 X |
| 2,988,321 | 6/1961 | Gilmont | 251—368 X |
| 3,138,175 | 6/1964 | Chilcoat | 137—625.48 X |

M. CARY NELSON, *Primary Examiner.*

A. ROSENTHAL, *Assistant Examiner.*